May 6, 1969 L. B. COURTOT ET AL 3,442,537
COMPOSITE FORGED FITTING OF DIVERSE METALS
Filed Oct. 1, 1964 Sheet 1 of 5
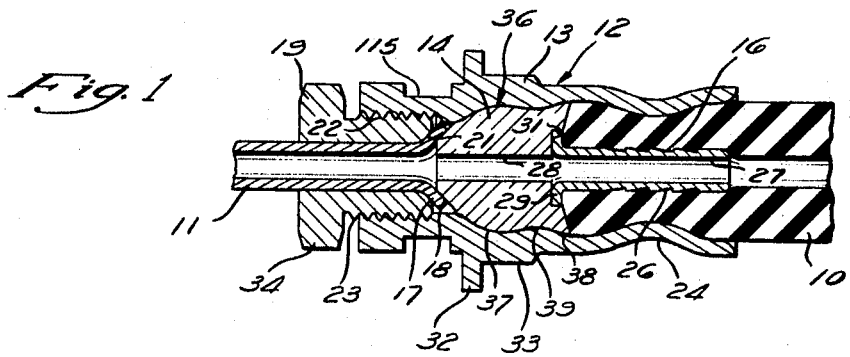
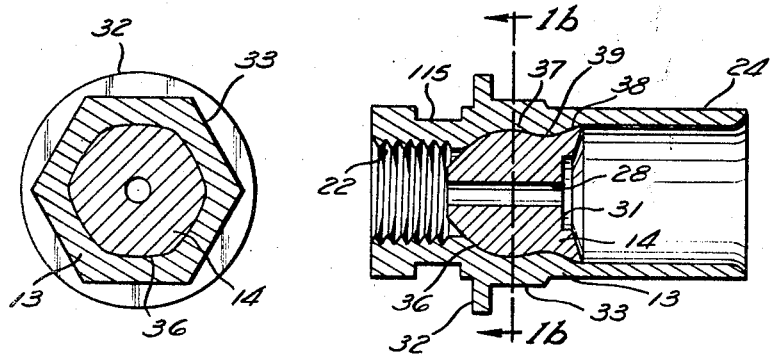
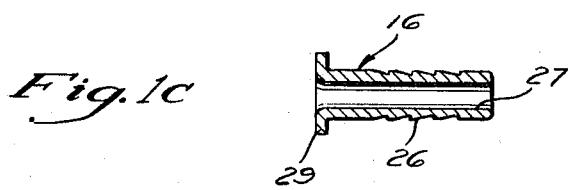
INVENTORS
LOUIS B. COURTOT,
& THOMAS J. MACK
BY
McNENNY, FARRINGTON, PEARNE & GORDON
ATTORNEYS

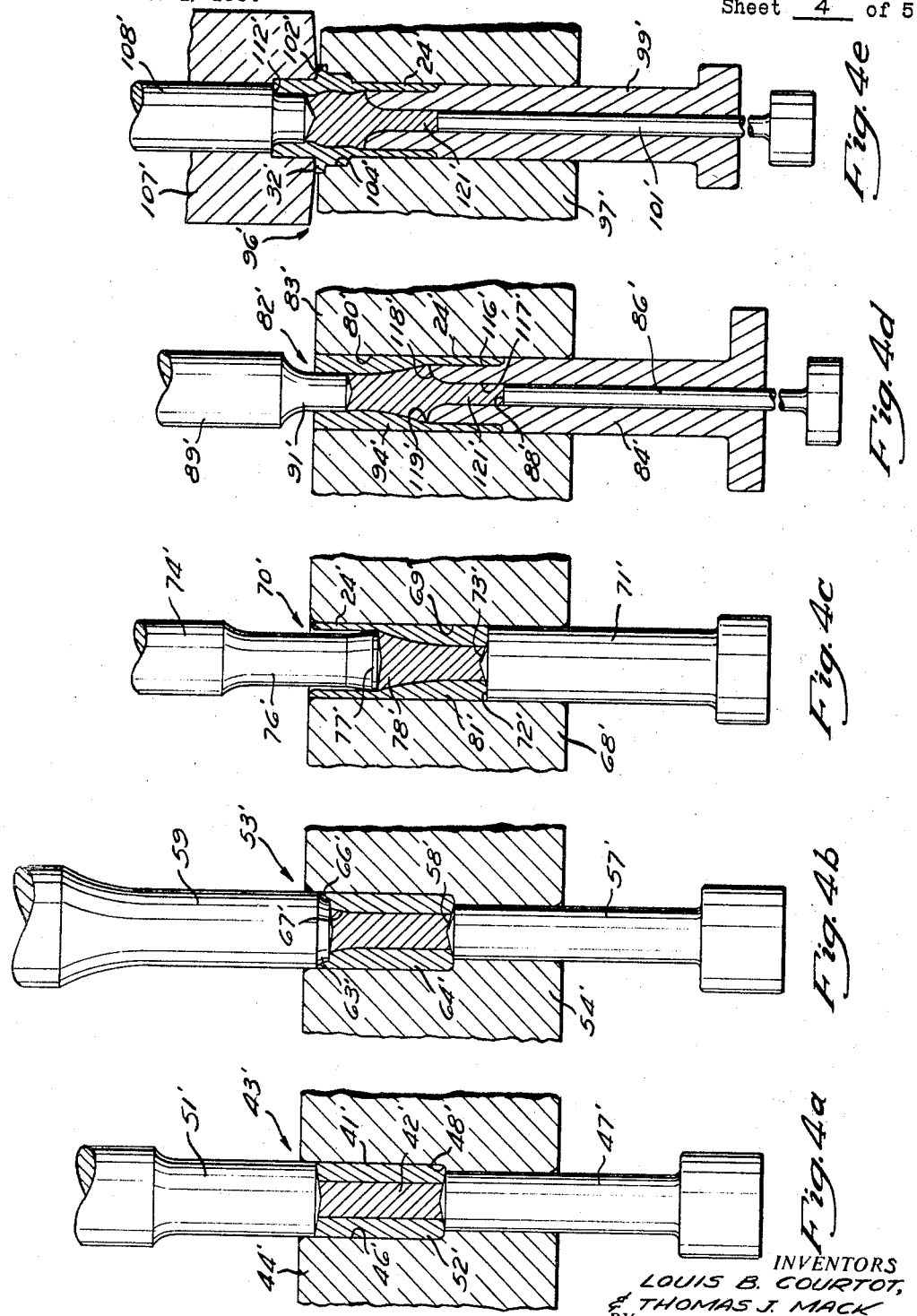

INVENTORS
LOUIS B. COURTOT,
& THOMAS J. MACK
BY
McNENNY, FARRINGTON, PEARNE & GORDON
ATTORNEYS

United States Patent Office 3,442,537
Patented May 6, 1969

3,442,537
COMPOSITE FORGED FITTING OF
DIVERSE METALS
Louis B. Courtot, Euclid, and Thomas J. Mack, Cleveland,
Ohio, assignors to The Weatherhead Company, Cleveland, Ohio, a corporation of Ohio
Filed Oct. 1, 1964, Ser. No. 400,701
Int. Cl. F16l 37/10
U.S. Cl. 285—174                                      2 Claims

ABSTRACT OF THE DISCLOSURE

Forged fittings such as tube fittings and hose fittings are formed from a blank of composite material of uniform cross-section having a jacket of one metal and a core of a different metal having a different modulus of elasticity. By simultaneously working the composite blank as in a progressive heading machine, the core and shell are worked together to become mechanically interlocked in the finished article even though no actual bonding takes place between the different metals. When the core has a lower modulus of elasticity in the finished article the core is in compression and the jacket is in tension.

This invention relates generally to forging and more particularly to a novel and improved composite article such as hose fitting or the like formed of two dissimilar materials and to a novel and improved method of manufacturing same.

It is often desirable to form an article such as a hose fitting or the like of two dissimilar materials in order to take advantage of the physical properties of one material to perform one facet of the article function and take advantage of the properties of another dissimilar material to perform other functions of the device. In other instances it is desirable to make such an article of dissimilar materials to minimize the required use of expensive materials.

In the past in hose couplings and the like it has been customary to manufacture such composite article by separately forming the component parts of the article and then assembling the separate components into the completed item. In some cases the components have been designed to be mechanically assembled and connected by interlocking means such as threads or bent tabs. In other instances the components have been welded, brazed or assembled with adhesives. Such previous procedures for manufacturing composite hose fittings or other similar articles when compared to a method of manufacturing incorporating this invention have resulted in the relatively high costs caused by high rates of scrap and substantial labor requirements.

In a method incorporating this invention a composite article is substantially completely formed by cold forming a blank having two dissimilar materials. The article produced is of uniform high quality because of the consistency achievable with forging operations with the scrap and machining minimized.

It should be understood that although this invention is illustrated in connection with the manufacture of a hose and tube fitting that many other composite articles can be manufactured by methods incorporating this invention and that such articles in of themselves may embody inventive features even though such articles may or may not be hose fittings per se.

It is an important object of this invention to provide a novel and improved composite hose fitting or the like formed of two dissimilar materials by closed die forging.

It is another important object of this invention to provide a novel and improved method for forging composite articles consisting of two dissimilar metals interlocked and substantially completed by the forging operations.

It is still another object of this invention to provide a novel and improved method of producing a hose fitting or the like having two dissimilar metals interlocked and substantially completely formed by forging with a minimum of scrap and machining.

It is another object of this invention to provide a novel and improved composite hose fitting formed of two dissimilar metals, such as a ferrous metal and copper base metal wherein the article is substantially completely formed with interlocking surfaces by forging and with a minimum of scrap.

It is still another object of this invention to provide a novel and improved method and apparatus of forging two dissimilar metallic materials wherein pressure exerted upon one material produces radial displacement of both materials along their line of intersetcion thereby interlocking and permanently connecting the two materials of the article.

It is still another object of this invention to provide a novel and improved method of forging composite articles consisting of two dissimilar materials wherein pressures exerted on one material is transmitted to the other material to produce radial and axial flow of at least one of the materials and results in a composite article permanently connected by irregularities in the deformation against both rotational and axial relative movement between the component parts.

It is still another object of this invention to provide a novel and improved hose fitting or the like consisting of two dissimilar metallic materials which are formed by forging and which are arranged so that fluid pressures do not exist along the line of engagement of the dissimilar materials.

Further objects and advantages will appear from the following description and drawings; wherein, FIGURE 1 is a view in longitudinal section of one embodiment of hose fitting incorporating this invention illustrated after assembly on a hose and tube;

FIGURE 1a is a side elevation in longitudinal section of the machined body assembly of the hose fitting of FIGURE 1 prior to the installation of the nipple which extends into the bore of the hose;

FIGURE 1b is a cross-section taken along 1b—1b of FIGURE 1a;

FIGURE 1c is a side elevation in longitudinal section of the nipple prior to its insertion into the body assembly of FIGURE 1a;

FIGURE 2a through 2e is a plan view illustrating the progressive forging operations utilized to form the body assembly of the fitting illustrated in FIGURE 1a;

FIGURE 4a through 4e is a plan view of the forming operations for progressively forming the body assembly of FIGURE 3a;

Figure 2E:
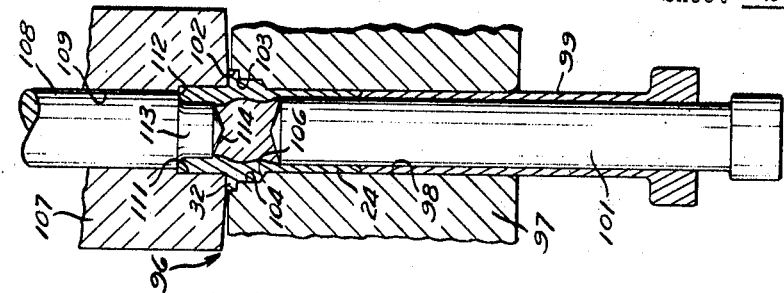
Figure 2D:
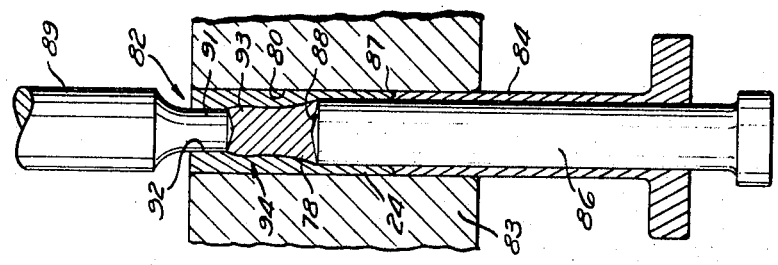

Referring now to FIGURE 1, a hose fitting incorporating this invention is illustrated which is used to connect a hose 10 to a piece of tubing 11. The fitting includes a body assembly 12 formed of two dissimilar materials. In the illustrated embodiment the outer portion 13 is preferably a low carbon steel and the inner portion 14 is a copper base metal, preferably brass. A nipple 16 formed of the same material as the inner portion 14 or outer portion 13 is brazed in place and cooperates with the inner portion 13 and outer portion 14 to form the complete body assembly 12. The tubing 11 is formed with a flared end 17 which seals against a seat 18 formed on the inner portion 14 and is held in position by a tubular nut 19 having a conical face 21 which engages the outer side of the flared end 17 and presses it against the seat 18 to provide the seal. The outer portion 13 of the body assembly 12 is formed with female threads 22 which mate with male threads 23 on the nut 19.

Prior to the mounting of the hose 10 in the fitting the body assembly skirt portion 24 is straight and is proportioned to permit the insertion of the hose into the end of the fitting over the nipple 16. After the hose is properly positioned the skirt 24 is deformed inwardly to compress the end of the hose material inward against the nipple 16 to provide the necessary fluid tight joint between the hose 10 and the nipple 16. The exterior surface of the nipple 16 may be formed with annular sawtooth grooves 26 to grip the hose material 10 and also improve the seal therewith. The nipple 16 is provided with a central passage 27 aligned with a central bore 28 in the inner portion 14. The end of the bore 28 is open to the interior of the tube 11 so that a through passage for fluid flow is provided between the hose 10 and the tubing 11.

Preferably, the nipple 16 is formed with an end flange 29 which is located in a circular recess 31 to provide sufficient area of engagement for a strong high quality brazed joint to mount the nipple. Since the fluid seal between the hose 10 and the nipple 16 occurs along the outer suface of the nipple 16 and a seal is present between the nipple 16 and the inner portion 14 the fluid is isolated from the outer portion 13 at the hose end of the fitting. Similarly, the seal between the tubing 11 and the body portion 12 is at the seat 18 formed on the inner portion 14 so fluid is isolated from the outer portion 13 at the tubing end of the fitting. Consequently the only contact that is possible between the fluid and the fitting is along the surfaces of the inner portion 14 and the nipple 16 which are both formed in the illustrated embodiment of a copper base metal, and no contact is provided between the fluid and the ferrous metal of the outer portion 13. In the illustrated embodiment the nut 19 is preferably formed of a ferrous metal of the same type as the outer portion 13. The body assembly 12 aside from the skirt 24 includes a relatively thick main section having an exterior radial flange 32 and a hexagonal wrenching portion at 33. The nut 19 is also formed with a hexagonal portion at 34 to permit the conventional use of wrenches.

The use of the steel for the outer portion 13 and the nut 19 provides an assembly wherein the fitting can be disassembled by removing the nut from the body assembly a substantial number of times without danger of damage to the elements and yet the properties of the copper base metal of the nipple 16 and the inner portion 14 are provided for contact with the fluid. Therefore, the fitting can be used with fluids which would be corrosive to ferrous metals without losing the structural strength and advantages of the ferrous type metal in the fitting. The use of a relatively soft copper or like alloy in a ferrous outer portion has a further advantage in permitting the use of steel tubing since a relatively soft metal seat portion is provided giving the desirable differential hardness between tube and seat required for optimum sealing.

The inner portion 14 and the outer portion 13 are shaped so that a permanent and positive mechanical interlocking is provided to prevent any relative movement therebetween. In the illustrated embodiment the boundary surface 36 between the inner portion 14 and outer portion 13 at 37 and 38 has a greater diameter than the boundary surface at 39 to provide an interlocking which prevents axial movement between the inner portion and the outer portion even under the axial load applied by the tightening of the nut 19. Of course axial movement is further resisted by the deformation of outer portion 13 as at 24 during assembly with hose 10. Further, the radial flow of the two materials required to form the hexagonal portion 33 produces a non-circular section in the boundary surface 36 which prevents relative rotation. This is best illustrated in FIGURE 1b. The generally hexagonal boundary is exaggerated in this figure for purposes of illustration. In actual practice it has been found the boundary is sufficiently non-circular to lock the elements against relative rotation.

The inner portion 14 and the outer portion 13 of the body assembly 12 are formed by combined or simultaneous cold heading and as a result there is an intimate contact between the two materials along the boundary surface 36. Pressure welding normally does not occur since in most materials difficult surface condition controls are required to produce pressure welding. Such controls are not required because the intimate contact and the mechanical interlocking provides a permanent assembly during the formation of the article.

The manufacture of the body assembly incorporating this invention is best understood by referring to FIGURE 2a through 2e. The initial blank from which the body assembly is forged includes a tubular outer shell 41 and a cylindrical core 42. The initial blank in the illustrated embodiment is formed with a tubular shell or low carbon steel or other suitable ferrous metal. The core 42 is preferably a brass copper base material. The initial blank can be manufactured by any suitable method. As an example, one method includes cutting tubular pieces from tubing stock to form the outer shell 41 and cuting cylindrical pieces from rod stock for the core 42. The two pieces may then be pressed together to produce the initial blank.

The initial bank is worked in a first working station 43 of a typical progressive forming machine. Since progressive forming machines utilized to make nuts, bolts, and the like, are well known in the art the details of the machines structure are not shown, however, the machine should be of the type which provides for the progressive working of a blank in a plurality of working stations with automatic transfer of the blank between the stations after each working opeartion.

Figure 2C:
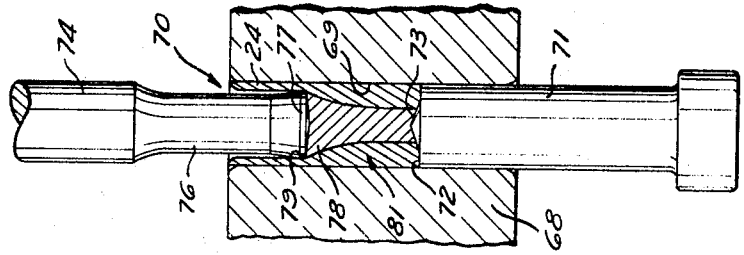
Figure 2B:
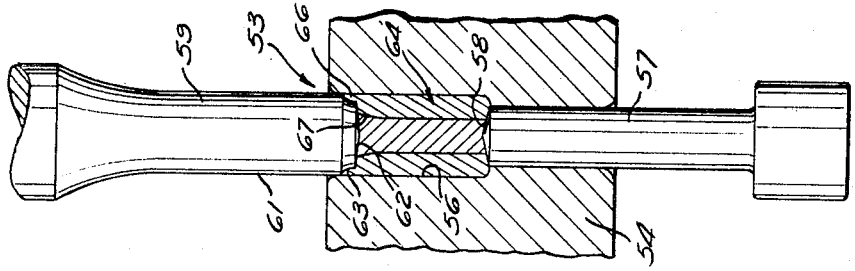
Figure 2A:
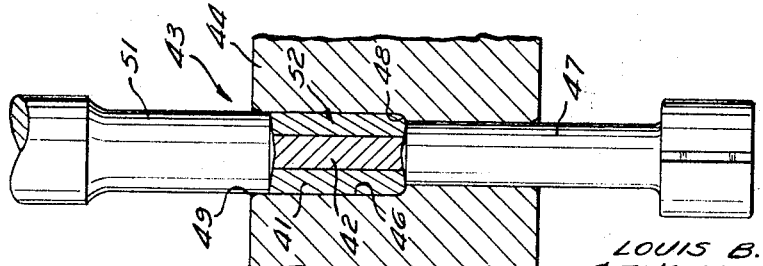

The first working station 43, shown in FIGURE 2a, includes a cylindrical die 44 formed with a cylindrical die cavity 46 closed at its inner end by a knockout pin 47. The inner end of the die cavity 46 adjacent to the end face of the knockout pin 47 is preferably rounded at 48 and the outer end of the die cavity is preferably rounded at 49. A punch 51 carried by a reciprocating slide moves to the position illustrated in FIGURE 2b at the forward extreme position. In this position the initial blank is pressed into the die cavity and subjected to substantial endwise pressure to size the blank and face the ends producing a composite blank 52 having shallow conical recesses at its ends.

After the punch 51 is carried back from the die 44 by the slide the knockout pin 47 is pressed forward in the usual manner to eject the blank 52 from the die 44. It is then carried by the transfer to a second die station 53 of FIGURE 2b. A die 54 located at the second die station 53 is formed with a cylindrical die cavity 56 closed at its inner end by a knockout punch 57 having a conical end face 58. The diameter of the knockout punch 57 is substantially less than the diameter of the die cavity 56, as illustrated.

A forming punch 59 is mounted on the slide to reciprocate toward and away from the die 54 and is illustrated in its forward extreme position in FIGURE 2b. The punch 59 formed with a cylindrical outer surface 61 proportioned to closely fit the die cavity 56 and a nose portion with a shallow conical end face 62 is joined to the cylindrical surface 61 by a concave curved portion 63. Therefore, the punch 59 forms the outer end of the blank 52 and results in a blank 64 shaped as illustrated in FIGURE 2b.

The blank 64 is generally cylindrical in shape having a shallow conical recess at its inner end formed by the end face 58, rounded lower corners and an intermediate skirt portion 66 which is formed by the combined piercing and backward extrusion produced by the forward end of the punch 59. Because there is radial flow of the material forming the tubular shell 41 caused by the extrusion of the material into the skirt 66 there will also be radial displacement of the portion of the core material at 67.

It should be understood that the pressures exerted on the tubular shell 41 and the cylindrical core 42 are sufficiently high to produce plastic flow of the materials constituting both portions of the blank and therefore the pressures are transmitted between the two materials with the result that the materials of the two portions tend to flow in a manner somewhat similar to the flow which would occur if the blank were formed of only one material. This is true even though the pressure required toproduct plastic or forging flow ing of the core material may be substantially less than the presusre required to produce plastic or forging flow of the shell material, because the core material, which in the illustrated embodiment is a copper base material, is totally confined by the combined surfaces of the knockout pin 57, the punch 59 and the boundary layer between the core and the shell. In otherwords, the core material has no place to flow until sufficient pressure is present to produce flow of the shell and in a sense the core acts as a fluid transmitting the endwise pressure applied to the core into the shell and substantially equalizes the pressures occurring therein.

After the punch 59 retracts from the die 54 the knockout pin 57 is pressed forward in the usual manner to eject the blank 64 from the die 54 into the transfer which transfer the blank to the third die station (FIGURE 2c) at 70. A die 68 having a cylindrical die cavity 69 is provided at the third die station 70. In this instance a knockout pin 71 is provided with a diameter proportioned to closely fit the die cavity 69 and is provided with a radial end face 72 extending inwardly to a centrally located conical convex end face 73. A punch 74 carried by the reciprocating slide is formed with a forward end 76 having an extrustion land 77 of a diameter sized to produce an inner diameter of the skirt 24 of the finished body assembly 12. The portion of the extrusion end 76 rearwardly from the extrusion land 77 is of reduced diameter to minimize friction and wear.

As the punch 74 approaches the forward position illustrated in FIGURE 2c it exerts pressure on the end of the blank 64 located in the die 68 and produces backward extrusion of the metal forming the outer shell and thus forms the skirt portion 24.

In order for the shell material to flow into the skirt portion 24 during the backward extrusion it is necessary for some of the material of the shell portion of the blank to flow radially outward. This causes the adjacent material of the core to also flow radially outward forming an enlarged section 78. The proportions of the original blank and the amount of extrusion required to form the skirt 24 are preferably arranged so that the boundry between the enlarged section 78 and the shell material is located at 79 substantially adjacent to the inner end of the skirt 24.

The blank 81 is completed in the third die station 70 and is ejected by the knockout 71 after the punch 74 is carried back from the die 68. The transfer for moving the blank 81 to a fourth die station 82 (FIGURE 2d) is arranged to turn the blank end-for-end and position the blank in the dies of the fourth die station with the skirt 24 at the inner end.

A die 83 formed with a through bore 80 constituting a die cavity is mounted at the fourth die station 82. A tubular stripper sleeve 84 closely fitting the bore 80 extends into the rearward end of the die 83 and is provided with a pin 86 extending therethrough. The inner diameter of the stripper sleeve 84 and the outer diameter of the knockout 86 are substantially equal to the inner diameter of the skirt 24 and the diameter of the bore 80 and the outer diameter of the stripper sleeve 84 are substantially equal to the exterior diameter of the blank 81. The forward end face 87 of the stripper sleeve 84 is spaced back from the end face 88 of the knockout 87 by distance proportioned so that the end of the skirt 24 engages the stripper sleeve when the end face 88 engages the core material. Therefore, the skirt end of the blank 81 is substantially completely confined and is not worked in the fourth die station 82.

A punch 89 is mounted on the reciprocating slide. The forward end of the punch 89 is formed with a cylindrical extension 91 having a diameter larger than the initial diameter of the core 42. Therefore, as the punch 89 approaches the forward position illustrated the shell material is socketed to a certain extent and backward extruded to form a blind passage 92 on the end opposite the skirt 24. Here again, backward extrusion produces some radial displacement of the material of the shell and causes an enlargement 93 in the core material.

After the punch 89 is carried back from the die 83 at the completion of the working stroke the stripper sleeve 84 is pressed forward to eject the blank from the die 83 in the usual manner. Here again, the blank 94 completed in the die station 82 is transferred to a fifth and final working station 96 of FIGURE 2e.

A die 97 mounted at the fifth die station 96 (FIGURE 2e) is provided with a uniform diameter bore 98 having a diameter substantially equal to the outer diameter of the skirt 24. Here again, a stripper sleeve 99 is positioned in the bore 98 and a tool 101 extends therethrough in a manner similar to the structure at the die station 82. The stripper sleeve 99, the tool 101 and the bore 98 therefore cooperate to confine the skirt 24 and prevent further working of the material thereof in this die station.

The die 97 is formed with a circular recess 102 adjacent to its forward face which extends back to a conical transition section 103 joining a hexagonal portion of the die cavity 104. Rearwardly of the hexagonal portion 104 the die 97 is formed with a second transition section 106 which joins with the bore 98. Therefore, the die cavity of the die 97 has a first portion to receive the skirt and second and third portions in which the wrenching portion 33 of the finished body assembly is produced as well as the flange 32.

Mounted on the reciprocating slide at the fifth die station 96 is an upsetting tool 107 having a centrally located punch 108 extending through a bore 109 formed in the tool 107. The upsetting tool 107 is formed with a bore 111 extending back from its forward face to a shoulder 112 joining the bore 109 and the forward end of the punch 108 is formed with a cylindrical projection 113 projecting into the bore 111 and having a diameter larger than the extension 91 of the punch 89. A conical end face 114 is formed on the end of the punch 108.

As the reciprocating slide carries the upsetting tool 107 and the punch 108 toward the forward extreme position illustrated in FIGURE 2e the blank 94 is engaged and carried into the die 97. Toward the end of the forward stroke the punch 108 presses into the blind bore 92 of the blank 94 radially expanding the walls of the shell material adjacent to the projecting end of the blank until the shell material completely fills the space between the cylindrical projection and the bore 111. Further forward movement produces upsetting of the blank material to fill out the hexagonal portion 104 and the recess 102 in the die 97.

The hexagonal portion 104 is radially larger than the maximum diameter of the blank 94 formed in the previous die station so it is necessary for material to flow radially to fill the hexagonal portion of the die cavity. Similarly, the recess 102 has a substantially larger diameter than the bore 98 so blank material must also flow radially to fill the recess and produce the flange 32. As this upsetting occurs the material in the shell flows radially to fill the die cavity and material of the core flows radially to fill the void caused by the radial displacement of the shell material. Consequently, the core material in the zone inwardly from the flange 32 has a maximum diameter greater than the portion 39 spaced therefrom and located in an area where substantial upsetting does not occur. Consequently, the mechanical interlocking of the core material within the shell material is produced by the non-uniform radial displacement of the shell material. Also, the fact that the wrenching portion 33 is not of uniform diameter but rather is hexagonal in shape causes variations in radial displacement to fill out the hexagonal portion 104 of the cavity and this produces a non-circular boundry between the core, best illustrated in FIGURE 1b, and shell material which prevents relative rotation therebetween. Consequently, the core material is tightly locked in position.

Preferably, the material used to form the core and ultimately the inner portion 14 of the body assembly should have less spring back then the material used to form the shell or the outer portion 13. When the two materials have this relationship the shell material will tend to spring back slightly more than the core material and cause a very tight engagement between the two portions of 13 and 14 of the body assembly 12.

After the tools at the die station 96 are carried back away from the die 97 the stripper sleeve 99 is operated to eject the blank completing the forging operations of this embodiment. The blank is then finished machined to form the recess 31 for the nipple 16 and the female threads 22. In the illustrated fitting an annular groove 115 is also cut into the forward end of the body assembly. After completion of the machining operations the article illustrated in FIGURE 1a is completed. The nipple, illustrated in FIGURE 1c is preferably formed by cutting a blank from tubing and flaring its end to form the flange 29. The annular grooves 26 are cut in the nipple 16 in any suitable manner. The nipple is then assembled by positioning the flange 29 in the recess 31 followed by the brazing of the nipple in place to complete the manufacture of the body assembly 12.

By manufacturing the body assembly 12 according to this invention scrap is greatly reduced and the machining expense is minimized. Further, a high quality composite fitting is provided because of the high uniformity and improved physical properties achievable with cold forging processing.

Figure 3:
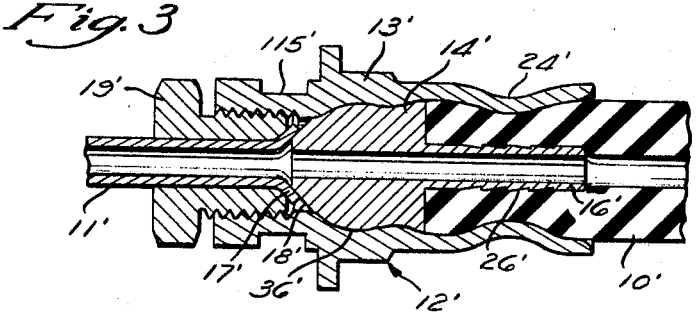
FIGURE 3 is a side elevation in longitudinal section of an assembled hose fitting according to a second embodiment of this invention wherein the nipple which extends into the hose is integrally formed during the forging operations.
Figure 3A:
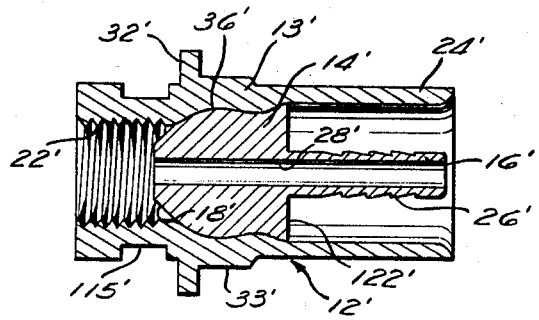
FIGURE 3a is a side elevation in longitudinal section of the body assembly of FIGURE 3 prior to its installation on a hose and tube.

Reference should now be made to FIGURES 3, 3a and 4, which illustrate a second embodiment of this invention illustrating a hose to tubing fitting having the identical functional structure as the embodiment of FIGURE 1. In this instance, however, the nipple which extends into the hose is formed during the cold forging operation and the necessity of a separate nipple forming and assembly procedure is eliminated. In the second embodiment similar reference numerals will be used to indicate similar structure with a prime (′) added to indicate that reference is being made to the second embodiment.

In FIGURE 3a the body assembly 12′ is indicated at the completion of manufacture and before assembly on a hose 10′. In FIGURE 3 the body assembly is shown after the completion of the assembly of the fitting on the hose 10′ and tubing 11′. Here again, the body assembly includes an outer portion 13′ formed of a ferrous metal and an inner portion 14′ formed of a copper base metal, such as brass. In this instance the nipple 16′ is integrally formed with the material of the inner portion 14′ during the forging operation. Here again, the boundry line 36′ of engagement between the inner portion 14′ and the outer portion 13′ is shaped so that the inner portion is positively and mechanically locked in position by the forming process.

FIGURE 4, like FIGURE 2, illustrates the progressive forming operations which are performed to produce the body assembly 12′, illustrated in FIGURE 3a. In this embodiment material required to form the nipple 16′ must be provided in the initial blank. However, the diameter of the blank remains the same as in the first embodiment. Therefore, the blank is slightly longer initially and the diameter of the core 42′ is slightly larger. The same amount of material is required to form the outer portion 13′ as is required to form the outer portion 13 of the first embodiment.

In the operation occurring at the first die station 43′ of FIGURE 4a the same functions are provided as in the first embodiment, namely the blank is squared and shallow recesses are formed in the opposite ends of the blank. After the forming operation at the first die station the blank 52′ is transferred to the second die station 53′ of FIGURE 4b. Hereagain, the operation of forming is the same as the operation in the second die station 53 of the first embodiment. The blank 64′ therefore is provided with the initial skirt 66′ and after forming is transferred to the third die station 70′, of FIGURE 4c, wherein a skirt 24′ is formed.

When the blank 81′ is transferred to the fourth die station 82′ of FIGURE 4d it is again inverted so that the skirt 24′ is located at the inner end of the die. In this die station, however, the stripper sleeve 84′ is formed with an annular recess 116′ extending back from its forward face and cooperating with the bore 80′ in the die 83′ to receive the skirt 24′ and prevent further working thereof. A stripper sleeve 84′ is also formed with a central bore 117′ having a diameter substantially equal to the maximum diameter of the nipple 16′ of the finished body assembly 12′. The bore 117′ is flared at its forward end to provide a curved extrusion throat 118′ to facilitate entry of the core material into the bore 117′. The knockout pin 86′ is positioned in the bore 117′ with its end face 88′ spaced back from the forward end of the stripper sleeve a distance equal to the required length for the nipple. As the punch 89′ moves forward to the position illustrated the material of the core is pressed axially relative to the material of the shell and is extruded into the bore 117′ until it engages the end face 88′ of the knockout punch 86′. The force required to cause a substantial reduction for extrusion into the bore 117′ is sufficiently great to insure that the core material will remain in the corner 119′ during this operation. Preferably, the cylindrical extension 91′ on the punch 89′ has a diameter slightly larger than the initial diameter of the core so that the higher deforming pressure of the ferrous metal of the shell will prevent backward extrusion of the core material along the cylindrical extension.

In effect, the shell material, which in this illustrated embodiment is low carbon steel, provides sufficiently higher resistance to deformation than the core material so that the shell performs a die or retaining function on the core material. As a result, a minimum amount of working occurs in the material forming the shell at this die station and a projection 121′ is formed on the blank 94′.

The blank 94′ is then transferred to the fifth and final die station 96′ of FIGURE 4e wherein the skirt 24′ and projection 121′ are supported against further working. The forging at this die station is substantially the same as in the corresponding die station of the first embodiment. The ejection of the blank 94' from the die station 82', however, is achieved by the knockout pin 86' rather than the stripper sleeve 84'.

The blank is then subsequently machined to provide the annular grooves 26', the female threads 22' and the annular recess 115'. During the machining operation the curved section adjacent to the junction between the nipple 16' and the inner portion 14' is machined away to provide a radial face 122'. Here again, the seat 18' is also formed by machining operations. Similarly, the bore 28' is machined in the finish piece, but in this instance it extends through the nipple 16'.

Here again, in this embodiment of our invention the scrap of machining is minimized and the high production, low cost forging methods are utilized to not only reduce cost but improve quality. The upsetting operation occurring in the fifth die station of this embodiment also produces the non-circular projections of the inner portion 14' and the non-uniform radial extension thereof to positively and mechanically lock the inner portion 14' within the outer portion 13'.

FIGURES 5 and 6a through 6d illustrate the method of manufacture and final structure of a third embodiment of this invention. This embodiment is an inverted fitting of the type having a tapered male pipe thread 131 and a hexagonal wrenching portion 132. The fitting is formed with a female thread 133 and a conical seat 134 of the type used in the flared tube fittings. Here again, the fitting is formed of two materials. In the illustrated embodiment the shell or outer portion 136 is a ferrous type metal, such as low carbon steel, and the inner portion 137 is a copper base material, such as brass. The seat 134 is formed in the copper base material and a through bore 138 extends therefrom to the end of the fitting.

The copper base material of the inner portion 137 projects radially at 139 into the material of the hexagonal portion 132 and serves to provide a positive mechanical locking of the inner portion 137 within the outer portion 136. Here again, the non-circular section which in this embodiment is the hexagonal portion 132 results in a non-circular projection 139 which prevents rotation between the parts of the fitting as well as axial locking of the parts.

Figures 5, 5A:
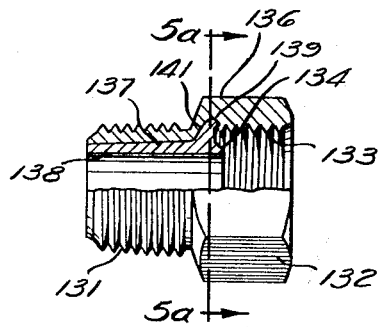
FIGURE 5 is a side elevation partially in longitudinal section of an inverted fitting constituting still a third embodiment of this invention.
FIGURE 5a is a cross-section taken along 5a—5a of FIGURE 5.

In the inverted fitting of FIGURE 5 fluid being conducted through the fitting is exposed to the boundary between the inner portion 137 and the outer portion 136 but leakage does not occur for two reasons. First, the tapered pipe thread 131 provides radial compression when the fitting is installed and tends to press the material of the outer portion along the pipe thread 131 radially inward into tighter engagement with the inner portion to prevent leakage along the boundary therebetween. Also, the assembly of a flared tube of the type similar to the tube 11 of the first embodiment by means of a nut similar to 19 of the first embodiment produces an axial thrust on the seat 134 which presses the radially extending surface 141 of the projection 139 against the mating surface of the outer portion and prevents leakage therebetween. Still further, the method of manufacturing inherently produces a tight engagement along the boundary between the two materials.

Referring now to FIGURE 6a through 6d. The inverted fitting of FIGURE 5 is progressively formed in four die stations. The initial blank has a tubular outer shell of uniform diameter and a cylindrical core which are preferably press fitted together in the manner similar to the first embodiment. However, in some instances the blank components may be joined mechanically as by furnace brazing. This blank is inserted in the first die station 142 at FIGURE 6a and worked to produce a blank 143. The die 144 is formed with a first bore 146 having a length at least equal to the length of the initial blank and extending inwardly to a conical extrusion throat 147 joined with a second bore 148 having a diameter less than the diameter of the bore 146. The inner end of the bore 148 joins with a conical surface 149 extending to a bore 151 in which a knockout pin 152 is positioned. The forward face 153 of the knockout 152 is positioned adjacent to the conical surface 149 completing the die cavity.

Figure 6D:
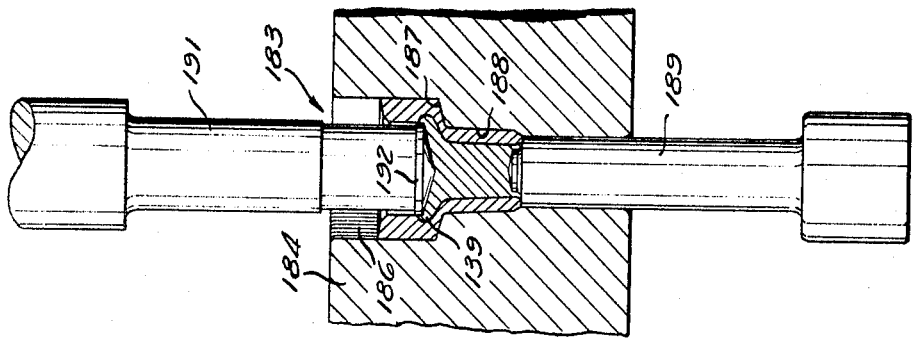
FIGURE 6a through 6d is a plan view in section illustrating the progressive forging operations for forming the inverted fitting of FIGURE 5.
Figure 6C:
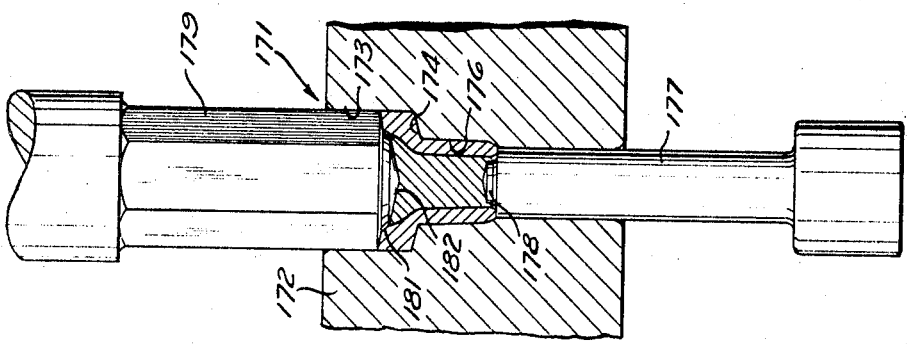
Figure 6B:
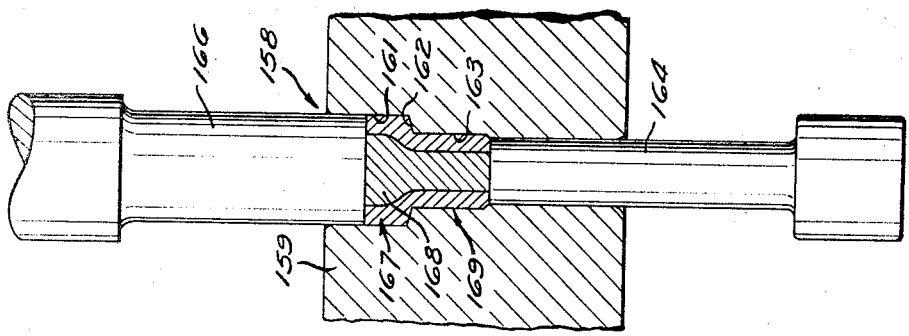
Figure 6A:
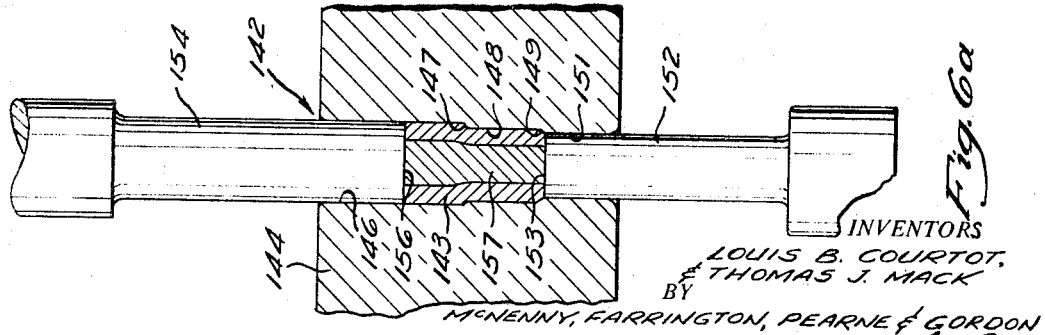

A tool 154 is mounted on a reciprocating slide and is carried thereby forward to the position illustrated in FIGURE 6a. The end face 156 engages the end of the initial blank and presses it along the bore 146, through the extrusion throat 147 and on into the die until it engages the end face 153. The passage of the material of the blank through the extrusion throat causes reduction in diameter of both the outer shell and the core so that the lower portion 157 of the core has a diameter less than the diameter of the initial blank.

After the tool 154 is carried back from the die 144 the knockout pin 152 moves forward to eject the blank 143 from the die into the transfer which carries it to a second die station 158 at FIGURE 6b. A die 159 at the second die station is formed with a first bore 161 extending inward to a conical surface 162 joining a second bore 163. The diameter of a bore 163 is substantially the same as the diameter of the bore 148, however, the diameter of the bore 161 is substantially larger than the diameter of the bore 146. Therefore, upsetting occurs of the unextruded portion of the blank 143 to enlarge its diameter.

A knockout pin 164 is positioned at the inner end of the die cavity and a tool 166 carried by the reciprocating slide works the blank as it approaches the forward position upsetting the unextruded material of the blank to form an enlarged upset portion 167 while the previously extruded section remains substantially unworked in the operation. During the upsetting operation which shortens the total length of the blank the material forming the outer shell is thickened and enlarged portion 168 is formed in the core material. After the tool is carried back from the die 159 the knockout 164 is operated to eject the blank 169 which is then transferred to a third die station 171 at FIGURE 6c.

A die 172 at the third die station is formed with a hexagonal die cavity 173 extending inward to a conical surface 174 which in turn joins a tapered portion 176 having a shape required to form the pipe thread section of the final fitting.

A knockout pin 177 has a cylindrical projection 178 positioned at the inner end of the tapered section 176. A hexagonal tool 179 carried forward by the reciprocating slide engages and upsets the blank 169 then positioned within the die 172. The forward end of the tool 179 is preferably formed with a first conical end surface 181 and a second conical end surface 182 inwardly therefrom. The included angle of the conical end surface 181 is less than the conical end surface 182 so that a chamfer will be formed which remains in the finished piece. Because non-uniform radial flow of the material is provided to fill the non-circular die cavity a non-circular shape is produced in the core material adjacent to the hexagonal portion of the shell material. This locks the elements against relative rotation.

After the blank is ejected from the third die station 171 by the knockout 177 it is transferred to the fourth and final die station 183 at FIGURE 6d wherein a socket is formed in the upset portion of the blank. A die 184 at the fourth die station 183 is formed with a hexagonal cavity 186 and a conical surface 187 which joins a tapered section 188. The knockout 189 is shaped substantially the same as the knockout 177 and cooperates with the tapered section 188 to prevent further working of the reduced diameter of the blank.

An extrusion punch 191 is mounted on the reciprocating slide and is formed with an extrusion land 192 having a diameter larger than the maximum diameter of the core material in the blank formed at the third station 171. Consequently, as the punch 191 enters the end of the blank the shell material is extruded backwardly along the polygonal die cavity portion 186 increasing the length of the blank and forming the socket in the end thereof for the subsequent formation of the female thread 133.

The core material is substantially completely confined and is axially shortened by the operation of the extrusion punch 191. Therefore, it flows radially into the zone of least resistance, which in this instance is the zone of the upset shell material which is backward extruding. As a result, the core material flows radially outward to form the projection 139, illustrated in FIGURE 5, which interlocks the core material and the shell material of the completed blank. After the punch 191 moves back from the die 184 the knockout pin 189 is actuated to eject the blank from the die. The blank is then in condition for finish machining by cutting the threads 131 and 133, forming the seat 139 and drilling the passage 138. The scrap produced by these necessary machining operations is relatively small compared to previous methods of forming composite blanks and the cost of machining is no greater than that which exists in forming of a fitting of the same type and shape of a single material. Further, the manufacture of the completed fitting is low since high production, low cost methods of forging are utilized to substantially completely form the blank.

It should be understood that even though all of the embodiments of this invention which have been described above refer to fittings this invention can be utilized for the manufacture of other types of articles which are within the scope of this invention. Also, it has been found that satisfactory results are also produced when the outer portion is a copper base metal with a mild steel core. Still further, other material, both metals and non-metals, may be used to form the completed article so long as the physical properties of the materials are compatible with the manufacturing procedures of this invention.

Although preferred embodiments of this invention are illustrated, it is to be understood that various modifications and rearrangements of parts may be resorted to without departing from the scope of the invention as defined in the following claims.

We claim:

1. A composite forged article of at least two different metals comprising an elongated forged tubular shell of one metal having at least one portion which is non-circular in cross-section and axially spaced portions having cross-sections of different peripheral lengths extending from said non-circular portion, said shell having an inner surface within said one portion which is non-circular and extends in a generally axial direction with axially spaced points on said inner surface having equal radii which are different than the radii of points intermediate thereof, said shell at said one portion having a wall thickness that varies in thickness at points having different radii, and a forged core of another metal having a lower modulus of elasticity than that of said shell metal positioned within said shell having an exterior surface in engagement with said inner surface of said shell, said core having a non-circular portion mating with said non-circular portion of said shell to prevent relative rotation between said shell and said core, said core being mechanically interlocked within said shell by the interengagement of said surfaces, said shell being placed in tention by its engagement with said core and said core being placed in compression by its engagement with said shell.

2. A composite forged fitting having an elongated forged shell of one metal and a forged core of another metal having a lower modulus of elasticity than the metal of said shell and positioned within said shell, said core having a passage therethrough, said core providing a nipple around one end of said passage adapted to fit into and seal with an end of a hose, said core having a seat at the other end of said passage adapted to seal with one end of a tube, said shell having a deformable skirt around said nipple adapted to clamp the end of the hose against the nipple, said shell having means adjacent said seat adapted to receive and hold the end of the tube in sealing engagement with said seat, said shell and said core having interengaging irregular surfaces mechanically interlocking them against rotational and axial movement in an intermediate zone between said nipple and said seat, said interengaging surfaces being isolated from fluid under pressure in said passage by said seat and said nipple when said fitting is assembled on a tube and hose, said shell having a portion intermediate its ends in said intermediate zone having a polygonal outer surface and a polygonal inner surface in axial alignment with said outer surface, said shell in said intermediate zone having portions of varying wall thickness between said inner and outer surfaces, said core having a polygonal surface in pressure abutting engagement with said inner polygonal surface of said shell whereby at said pressure abutting contact said core is under compression and said shell is under tension from said pressure abutting contact.

References Cited

UNITED STATES PATENTS

| | | | |
|---|---|---|---|
| 3,315,333 | 4/1967 | Kind et al. | 29—522 |
| 1,670,532 | 5/1928 | Crawford | 29—520 |
| 2,267,571 | 12/1941 | McDougal | 29—522 X |
| 332,354 | 10/1943 | Stecher | 285—38 2X |
| 2,370,603 | 2/1945 | Zimmerman | 29—520 |
| 2,494,241 | 2/1950 | Courtot | 285—256 X |
| 2,517,669 | 8/1950 | Hufferd et al. | 285—256 X |
| 2,955,222 | 10/1960 | Busch | 29—520 |
| 3,040,417 | 6/1962 | Newton | 29—520 X |
| 3,093,888 | 6/1963 | Huguby | 9—520 |
| 3,178,952 | 4/1965 | Ales | 29—522 |

FOREIGN PATENTS 872,580  7/1961  Great Britain.

THOMAS F. CALLAGHAN, *Primary Examiner.*

U.S. Cl. X.R.

29—522; 285—256, 329, 382.2